United States Patent [19]
Walker

[11] 3,956,141
[45] May 11, 1976

[54] ADDITIVE FOR REDUCING FLUID LOSS OR FILTRATION RATE FOR AQUEOUS DRILLING FLUID CONTAINING BOTH HIGH SALINITY AND HIGH SOLUBLE CALCIUM

[75] Inventor: Thad O. Walker, Houston, Tex.

[73] Assignee: Texaco Inc., New York, N.Y.

[22] Filed: Sept. 14, 1973

[21] Appl. No.: 397,531

[52] U.S. Cl. .......................... 252/8.5 A; 252/8.5 C
[51] Int. Cl.² .......................................... C09K 7/02
[58] Field of Search ............ 252/8.5 A, 8.5 B, 8.5 C; 260/233.3 R

[56] References Cited
UNITED STATES PATENTS

| | | | |
|---|---|---|---|
| 2,399,986 | 5/1946 | Chapman | 252/8.5 |
| 2,732,343 | 1/1956 | Rowe | 252/8.5 |
| 2,802,783 | 8/1957 | Weiss et al. | 252/8.5 |
| 2,813,093 | 11/1957 | Caldwell et al. | 260/233.3 |
| 2,871,189 | 1/1959 | Brukner | 252/8.5 |
| 2,876,217 | 3/1959 | Paschall | 260/233.3 |
| 2,935,509 | 5/1960 | Paschall | 252/8.5 X |
| 2,975,124 | 3/1961 | Caldwell et al. | 260/233.3 |
| 3,051,699 | 8/1962 | Elizer et al. | 260/233.3 |

*Primary Examiner*—Herbert B. Guynn
*Attorney, Agent, or Firm*—T. H. Whaley; C. G. Ries; Jack H. Park

[57] ABSTRACT

The fluid loss or filtration rate of aqueous drilling fluids containing either high salinity or high soluble calcium can be controlled with conventional products such as prehydrolyzed starch; however, if the aqueous drilling fluid contains both high salinity and high calcium ion concentrations, starch is not effective for control of fluid loss. The fluid loss of such an aqueous drilling fluid saturated with calcium hydroxide and containing high levels of salinity may be reduced by adding to the drilling fluid a small but effective amount of a cationic starch product.

8 Claims, No Drawings

ADDITIVE FOR REDUCING FLUID LOSS OR FILTRATION RATE FOR AQUEOUS DRILLING FLUID CONTAINING BOTH HIGH SALINITY AND HIGH SOLUBLE CALCIUM

BACKGROUND OF THE INVENTION

1. Field of the Invention

This invention relates to a novel additive for an aqueous drilling fluid and a method for drilling wells into subsurface formations utilizing drilling fluids containing said additive, and more particularly to an additive for reducing the fluid loss or filtration rate of aqueous drilling fluids which are saturated or essentially saturated with respect to calcium hydroxide and contain high levels of salinity.

2. Description of the Prior Art

Drilling fluids, or drilling muds as they are sometimes called, are generally slurries of clayey solids used in the drilling of wells in the earth, such as are drilled for the purpose of tapping subterranean deposits of petroleum, gas, and other fluid materials. Drilling fluids have a number of functions, the most important of which are removing formation cuttings from the well, sealing off permeable formations of gas, oil or water which may be encountered at various levels as the well is drilled into subterranean formations, cooling and lubricating the drilling tool and drill pipe which carries the tool, and holding the cuttings in suspension and the event of a shut-down and drilling and pumping of a drilling fluid.

An ideal drilling fluid is a thixotropic fluid, i.e., a fluid whose viscosity decreases as the degree of agitation or shear increases. The drilling of wells utilizing drilling fluids, agitation or shear is caused by pumping or otherwise circulating the fluid through the drill string. When agitation or shearing caused by circulation is halted, however, the fluid should gel or form a gel structure which will support the drill cuttings to prevent them from falling back into the bottom of the hole. The rate of gel formation must be such as to permit the cuttings to fall only a short distance before the gel structure is sufficiently strong to support them. It is important to maintain a degree of gelation and the rate of gelation within narrow limits, since excessive gel formation would be detrimental to resumption of drilling operations, and will also tend to entrain gas in the drilling fluid. Entrainment of gas in drilling fluids leads to a substantial reduction of a density or specific gravity of the drilling fluid, which is detrimental to continued safe drilling of the well in instances where high pressure formations are encountered. If the gelation rate and gel strength is below the desired range, formation cuttings and other solid materials such as weighting material will fall to the bottom of the hole which results in sticking of the drill pipe.

In many instances it is also highly desirable to control the rate of filtration, generally referred to in the art of oil well drilling fluids as "fluid loss". Many times wells are drilled into essentially impermeable formations, and when drilling through such formations the filtration rate or fluid loss of the drilling fluid is not essential and generally no attempt need be made to control it. When a well must be drilled through a permeable formation, however, some additive must be included in the drilling fluid composition to reduce the rate of filtration into the permeable formation. Excessively high filtration rates will result in the formation of a filter cake at the interface between the well bore and the formation, with the fluid phase of the drilling fluid passing into the formation and the suspended particulate phase accumulating in the filter cake at the well bore face. Filter cake accumulation rate is roughly parallel to gross filtration rate, and the thickness of the filter cake can become sufficiently large that interference with the drilling operation such as sticking of the drill pipe can result. For these and other reasons, it is frequently necessary to add a material to the drilling fluid in order to reduce the filtration rate or fluid loss to an acceptably low value. Fortunately, compositions are known which can reduce the fluid loss or filtration rate of conventional drilling fluid systems quite effectively. For example, prehydrolyzed starch and carboxymethylcellulose are both well known in the art of oil well drilling fluid technology for the purpose of reducing the filtration rate or fluid loss of aqueous based drilling fluids.

Special purpose drilling fluids are used in certain geographical areas where the well must penetrate formations known as heaving or sloughing shales. An aqueous drilling fluid containing excess calcium hydroxide and other water soluble salts having a prescribed filtrate alkalinity is described in U.S. Pat. No. 2,802,783 (1957) W. J. Weiss, et al, and this drilling fluid has been very successful for drilling certain types of "mud making" heaving shales encountered in the Gulf Coast region. A distinctly different aqueous drilling fluid for controlling a different type of heaving shale is disclosed in pending application, Ser. No. 309,327 filed Nov. 24, 1972, now abandoned which has been highly successful for drilling through Illitic, non-mud making heaving shales encountered in the Delaware Basin area of West Texas and New Mexico, specifically the Pennsylvanian-Mississippian interval. This latter drilling fluid, a low solid shale control drilling fluid, is also saturated with respect to calcium hydroxide and has excess or undissolved calcium hydroxide dispersed therein, and further contains a small amount of another calcium salt having a solubility greater than the solubility of calcium hydroxide, and which may additionally contain appreciable quantities of sodium chloride, or which may even be saturated with respect to sodium chloride. This novel low solid shale control drilling fluid is distinct from the first mentioned shale control drilling fluid in that it is a highly flocculated system, being characterized by an API fluid loss in excess of 100 cc's and a ratio of yield point to plastic viscosity less than 1. Most drilling fluids, including the first described shale control drilling fluid, are responsive to treatment with conventional fluid loss or filtration rate controlling additives such as prehydrolyzed starch or carboxymethylcellulose. Starch may be used effectively in any drilling fluid containing appreciable quantities of soluble calcium or containing a high level of salinity. If the system contains both high salinity level and high soluble calcium ion concentration, neither starch or carboxymethylcellulose are effective for controlling the fluid loss of the drilling fluid. Although the low solid shale control drilling fluid may frequently be used during a prolonged drilling period with essentially no additive present for the purpose of controlling fluid loss, there are instances where it is desirable to use such a drilling fluid for penetrating an Illitic heaving shale interval, in the drilling of a well in an area where known permeable formations will be encountered either above or below the Illitic heaving shale interval. Accordingly, there is a substantial commercial need for a method for reducing the fluid loss of a low solid shale control drilling fluid having both high salinity and high soluble calcium levels, especially a drilling fluid which is saturated with respect to calcium hydroxide and essentially saturated with respect to sodium chloride, which additive will not otherwise distort either the rheological or chemical properties of the drilling fluid.

SUMMARY OF THE INVENTION

The filtration rate or water loss of an aqueous drilling fluid which is saturated with respect to calcium hydroxide, and which may contain excess or undissolved calcium hydroxide dispersed therein and which is essentially saturated with respect to sodium chloride, can be effectively reduced by treating the drilling fluid with a small but effective amount of a cationic starch material. From about ½ to about 15 pounds of the cationic starch material per barrel of low solids shale control drilling fluid may be used, and preferably from about 4 to about 10 pounds of the material per barrel of drilling fluid will achieve a desirable and satisfactory reduction in filtration rate or fluid loss without adversely affecting the rheological or chemical properties of the drilling fluid.

DESCRIPTION OF THE PREFERRED EMBODIMENTS

This invention pertains to a novel additive for controlling the water loss or filtration rate of an aqueous lime containing drilling fluid which is essentially saturated with respect to calcium hydroxide or lime, and which may contain excess or undesirable lime, and which may contain additional water soluble calcium salts dissolved therein, said fluid also containing appreciable quantities of sodium chloride dissolved therein. The material is a cationic starch, which may be either a tertiary aminoalkyl ether, or a quaternary ammonium starch.

Starch is a polysaccharide widely found in nature, and utilized in a variety of commercial applications. The fundamental unit in starch is glucose, or maltose. It may be considered to be formed by repeated union of maltose units, and the structural formula is generally considered to be that reproduced below

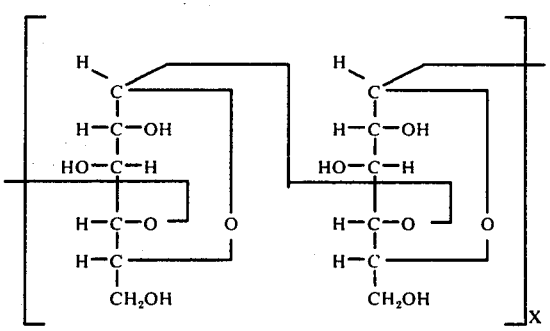

For our purpose, we may represent each of the above shown maltose maltoside units with the letter S, and the hydroxyl group which enters into the reaction giving rise to the cationic starch product in the following manner.

S — OH

The two species of cationic starch which may be utilized in accordance with my invention are as follows:

1. A tertiary aminoalkyl ether which is manufactured by reacting an alkaline starch slurry with 2-dimethylaminoethyl chloride according to the following reaction.

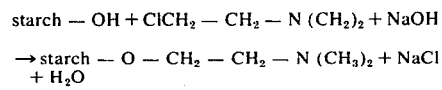

$\rightarrow$ starch — O — $CH_2$ — $CH_2$ — N $(CH_3)_2$ + NaCl + $H_2O$

The above described tertiary aminoalkyl ether may be reacted with an acid to form a tertiary ammonium salt.

2. A quaternary ammonium starch may be formed by reacting an alkaline starch slurry with N — (2,3 epoxypropyl)-trimethylammonium chloride, as is shown below.

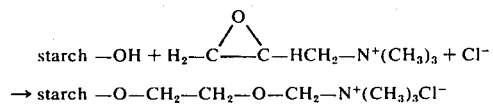

$\rightarrow$ starch —O—$CH_2$—$CH_2$—O—$CH_2$—$N^+(CH_3)_3Cl^-$

Both of the above described materials are available commercially, and are known to show affinity for negatively charged substrates such as cellulose, certain synthetic fibers, and aqueous suspensions of minerals. It is utilized as an internal binder and manufacturing paper, and is also an effective emulsifying agent for water repellent sizes. The cost of the material ranges from about 10 to about 20 cents per pound, which compares favorably with many materials utilized for fluid loss reduction additives in conventional aqueous drilling fluids.

The material which has been utilized in the test to be described later herein below is available commercially under the trade name of C-300 Polymer distributed by CPC International.

The type or class of aqueous drilling fluids for which this additive is especially desirable for the purpose of reducing filtration rate or fluid loss values, or aqueous fluids having high calcium concentrations, e.g., at least 200 parts per million and ranging upwards of 1,000 parts per million, plus high salinity values, e.g., sodium chloride levels of 100,000 parts per million and above.

Although many conventional prehydrolyzed starch products as well as carboxymethylcellulose are known to effectively reduce the fluid loss of drilling fluids containing either high calcium levels or high sodium chloride levels, none are effective in aqueous drilling fluids containing both high soluble calcium levels and high salinity levels such as those described above. The low solid shale control drilling fluid for which this additive is especially useful has an aqueous phase saturated with respect to calcium hydroxide and also has high concentrations of sodium chloride or other highly water soluble chloride salts. The low solid shale control drilling fluid will generally have a soluble calcium level in excess of 200 and frequently as high as 1,000 parts per million, and a filtrate alkalinity greater than 0.5 milliliters of 0.02 normal sulfuric acid per milliliter of filtrate. The whole drilling fluid will typically have at least 1 pound of excess or undissolved calcium hydroxide per barrel of drilling fluid. The rheological properties of the drilling fluid are somewhat unique in that the ratio of plastic viscosity to yield point is generally not greater than 1, and the API filtration rate of the untreated drilling fluid is frequently in excess of 100 milliliters. Ordinarily the high filtration rate is not troublesome, and it is not unusual to drill a relatively long segment of the hole using a low solids shale control drilling fluid without any attempt being made to control the fluid loss or filtration rate, and without encountering any problems as a result of this high filter loss. When it is expected that the well will penetrate a highly permeable zone, it is frequently necessary to reduce the filtration rate to a value substantially less than 100 cc's, in order to avoid drilling problems such as are encountered when high filtration rate fluids create thick filter cakes along the well bore, which may result in sticking of the drill pipe. Most permeable formations can be drilled if the API fluid loss can be reduced to a value between about 10 cc's and about 20 cc's.

Fluid loss values are generally determined by means of a pressurized filter cell utilizing pressure and time values prescribed by the American Petroleum Institute, hence the term "API Fluid Loss". The test specifications require that the filter paper be 9 centimeters in diameter and 1 filter paper be used in the cell. Ordinarily, 100 pounds per square inch of pressure by any convenient inert gas such as nitrogen is applied to the fluid and a number of cc's obtained in a 30 minute interval is measured and reported as the API fluid loss.

The concentration of cationic starch necessary to reduce the API fluid loss of a low solid shale control drilling fluid to the desired range will ordinarily depend on the original API fluid loss of the drilling fluid as well as on other factors. Generally it is highly recommended that the amount required be determined by pilot tests utilizing a sample of the drilling fluid, and measuring the fluid loss of samples which have been treated with varying concentrations of cationic starch. Very slight adjustments in fluid loss may require as little as ¼ to ½ pound of cationic starch per barrel of drilling fluid, although usually more than this amount will be required. Generally the fluid loss values will be adjusted only in those situations where it is desired to drill through a permeable interval, and so a fairly sizeable reduction will be necessary. Generally from about 4 to about 10 pounds of cationic starch per barrel of drilling fluid will achieve a reduction from a value in excess of 100 cc's to a value between about 10 and about 25 cc's, which will ordinarily permit drilling of permeable formations without appreciable drilling problems.

Care must be taken to measure the rheological properties of the drilling fluid samples which have been treated with varying amounts of cationic starch, to insure that the yield point and gel strength values have not been severely distorted from the desired range. One common technique frequently employed by persons skilled in the art of drilling fluid technology for measuring rheological properties is the utilization of a shearometer tube to determine gel strength. In measuring gel strengths by use of the shearometer tube, a measured quantity of drilling fluid is placed in a container and agitated or shaken, and a shearometer tube is dropped into the drilling fluid immediately after determination of agitation. If the shearometer tube sinks only part way into the drilling fluid contained in the container during a 60 second interval, the tube is removed and the depth that it has penetrated into the fluid is measured. The drilling fluid is allowed to stand without further agitation for 10 minutes, and the shearometer tube is again dropped into the drilling fluid. Again, if the shearometer tube sinks only part way into the bottom of the container, the depth of penetration is measured. If the shearometer tube sinks 3 centimeters into the test conducted immediately after agitation, and sinks 5 centimeters after the drilling fluid has stood without further agitation for 10 minutes, the gel strengths are indicated as 3–5. If on the other hand, the shearometer tube drops to the bottom of the container in less than 60 seconds, the time required for the shearometer tube to drop all the way to the bottom of the container is noted. If the tube drops to the bottom of the container in 15 seconds, for example, the gel strength is reported as $0^{15}$.

Another instrument commonly utilized for the purpose of measuring accurately the rheological properties of aqueous based drilling fluids is the Fann VG meter. The Fann VG meter provides a means for rotating a metallic cylinder in the drilling fluid at two rates, 300 and 600 rpm, and detecting the drag between the rotating cylinder and a non-rotating concentric cylinder inside the rotating cylinder at each speed. From the 300 and 600 rpm deflection readings are calculated the plastic viscosity, which is a measure of the solids content of the drilling fluid; the yield point, which is a measure of the relative state of dispersion or flocculation; and the apparent viscosity.

EXPERIMENTAL

A series of tests were made to determine the effectiveness of a cationic starch sample for reducing the API fluid loss of a low solid shale control drilling fluid which was utilized for the drilling of a well in West Texas. The physical properties of the untreated low solid shale control drilling fluid shown in line 1 of Table 1 below. It can be seen that the API fluid loss of the untreated sample was 196 cc's. The filtrate chloride concentration was 168,000 parts per million, and the filtrate calcium level was 890 parts per million. At this high level, treatment with a conventional prehydrolyzed starch would not be expected to produce an acceptable reduction in API fluid loss. Indeed, the addition of 7 pounds of a prehydrolyzed starch which is normally effective for reducing the API fluid loss, to this particular sample, resulted in an increase in fluid loss from 196 to 228 cc's, as is seen in line 3 of Table I. A polysaccharide, which has been found to be effective for reducing the gel strength and yield point of low solid shale control muds or drilling fluids, produced only a very slight reduction in API fluid loss, specifically from 196 cc's to 180 cc's. The use of 7 pounds of prehydrolyzed starch per barrel of drilling fluid plus 2 pounds of polysaccharide per barrel of drilling fluid resulted in very satisfactory yield point, plastic viscosity and gel strength values, but again the API fluid loss was greater than that for the untreated low solid shale control drilling fluid. As can be seen in line 5, the use of 7 pounds of cationic starch per barrel of low solids shale control drilling fluid resulted in a reduction in API fluid loss from 196 cc's to 20.8 cc's. Coincidental with this reduction in API fluid loss was a reduction in gel strength and yield point values to a satisfactory level. Thus, the additive is effective for reducing yield point and gel strength values. The use of 7 pounds of cationic starch per barrel of drilling fluid plus 2 pounds of polysaccharide per barrel of drilling fluid resulted in an API fluid loss of only 14 cc's, and very low gel strength and yield point values. This established that the cationic starch and polysaccharide were compatible, and that still additional reductions in API fluid loss could be achieved by the use of the 2 materials together.

TABLE I

RHEOLOGY AND FLUID LOSS OF LOW SOLIDS SHALE CONTROL DRILLING FLUID

| Material Added | Pounds per Barrel | FANN VG METER Plastic Viscosity | FANN VG METER Yield Point | VALVES Apparent Viscosity | GEL STRENGTH Initial | GEL STRENGTH 10 Min | API Fluid Loss-cc | Filtrate Chloride p.p.m. | Filtrate Calcium p.p.m. |
|---|---|---|---|---|---|---|---|---|---|
| 1) — | — | 7.5 | 22 | 18.5 | 8 | 8 | 196 | 168,000 | 890 |
| 2) Polysaccharide[1] | 2 | 7.0 | 6.5 | 10.3 | 0[2] | 0[3] | 180 | 168,000 | 890 |
| 3) Prehydrolyzed Starch[2] | 7 | 15 | 17.0 | 23.5 | 5 | 5 | 228 | 168,000 | 890 |
| 4) Polysaccharide + Starch[2] | 2 7 | 17 | 4.5 | 19.3 | 0[1] | 0[2] | 212 | 168,000 | 890 |
| 5) Cationic Starch[3] | 7 | 17 | 2.0 | 18 | 0[1] | 0[1] | 20.8 | 168,000 | 890 |
| 6) Cationic Starch[3] + Polysaccharide[1] | 7 2 | 15 | 1.5 | 15.8 | 0[1] | 0[1] | 14.0 | 168,000 | 890 |

[1]MOR-REX
[2]MY-LO-GEL
[3]C-300 POLYMER

Thus, I have disclosed and demonstrated in laboratory tests that the use of a small but effective amount of a cationic starch in a low solid shale control aqueous drilling fluid will effectively reduce the API fluid loss of the drilling fluid, even though commercially available materials normally utilized for this purpose are ineffective in the high calcium, high salinity environment of this type of drilling fluid. While this invention has been disclosed in terms of a number of illustrative embodiments, it is obvious that many other variations will be apparent to those persons skilled in the art of drilling fluid technology without departing from the true spirit and scope of my invention. It is my desire and intention that my invention be restricted and limited only by those restrictions and limitations appearing in the claims appended hereinafter below.

I claim:

1. A low solids aqueous drilling fluid having an aqueous liquid phase essentially saturated with calcium hydroxide and containing at least 200 parts per million soluble calcium and also essentially saturated with respect to sodium chloride, containing as the additive for reducing the fluid loss, a cationic starch material selected from the group consisting of a tertiary aminoalkyl ether starch with the following structure:

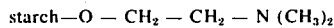

and a quaternary ammonium starch with the following structure:

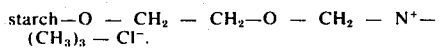

2. A drilling fluid as recited in claim 1 wherein from about ½ to about 15 pounds of the cationic starch is added per barrel of drilling fluid.

3. A drilling fluid as recited in claim 1 wherein from about 2 to about 10 pounds of the cationic starch is added per barrel of drilling fluid.

4. A low solids, aqueous drilling fluid having an aqueous liquid phase saturated with respect to calcium hydroxide and containing at least 200 parts per million soluble calcium and at least 100,000 parts per million chloride, containing as the additive for reducing the fluid loss of the drilling fluid, a cationic starch material selected from the group consisting of a tertiary aminoalkyl ether starch with the following structure:

and a quaternary ammonium starch with the following structure:

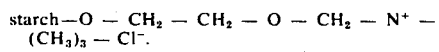

5. A drilling fluid as recited in claim 4 wherein the cationic starch is tertiary aminoalkyl ether.

6. A drilling fluid as recited in claim 4 wherein the cationic starch is a quaternary ammonium starch.

7. A drilling fluid as recited in claim 4 wherein from about ½ to about 15 pounds of cationic starch is added per barrel of drilling fluid.

8. A drilling fluid as recited in claim 4 wherein from about 2 to about 10 pounds of cationic starch is added per barrel of drilling fluid.

* * * * *